(12) United States Patent
Zhang et al.

(10) Patent No.: US 12,266,979 B2
(45) Date of Patent: Apr. 1, 2025

(54) MOTOR ROTOR, PERMANENT MAGNET MOTOR, AND ELECTRIC VEHICLE

(71) Applicant: GREE ELECTRIC APPLIANCES, INC. OF ZHUHAI, Zhuhai (CN)

(72) Inventors: Xiaobo Zhang, Zhuhai (CN); Changguang Guo, Zhuhai (CN); Jinxin Jia, Zhuhai (CN); Hanxin Wang, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 234 days.

(21) Appl. No.: 18/005,951

(22) PCT Filed: Jul. 30, 2021

(86) PCT No.: PCT/CN2021/109494
§ 371 (c)(1),
(2) Date: Jan. 18, 2023

(87) PCT Pub. No.: WO2022/110865
PCT Pub. Date: Jun. 2, 2022

(65) Prior Publication Data
US 2023/0283130 A1    Sep. 7, 2023

(30) Foreign Application Priority Data

Nov. 30, 2020   (CN) .......................... 202011381538.3

(51) Int. Cl.
*H02K 1/28*      (2006.01)
*H02K 1/276*    (2022.01)

(52) U.S. Cl.
CPC ............... *H02K 1/28* (2013.01); *H02K 1/276* (2013.01); *H02K 2213/03* (2013.01)

(58) Field of Classification Search
CPC ......... H02K 1/28; H02K 1/27; H02K 2213/03
(Continued)

(56) References Cited

U.S. PATENT DOCUMENTS

| 2002/0047435 A1* | 4/2002 | Takahashi | H02K 1/246 |
| | | | 310/156.56 |
| 2009/0261679 A1 | 10/2009 | Sakai et al. | |
| 2012/0194026 A1* | 8/2012 | Matsuoka | H02K 1/2766 |
| | | | 310/156.53 |

FOREIGN PATENT DOCUMENTS

| CN | 102522840 A | 6/2012 |
| CN | 103280904 A | 9/2013 |

(Continued)

OTHER PUBLICATIONS

Office Action mailed Apr. 17, 2024, in corresponding Chinese application No. CN202011381538A, filed Nov. 30, 2020, 19 pages.

(Continued)

*Primary Examiner* — Jose A Gonzalez Quinones
(74) *Attorney, Agent, or Firm* — Christensen O'Connor Johnson Kindness PLLC

(57) ABSTRACT

The present disclosure relates to a motor rotor, a permanent magnet motor, and an electric vehicle. The motor rotor includes a rotor core (1) and permanent magnets (3). The rotor core (1) includes mounting slots (2). The permanent magnets (3) are arranged in the mounting slots (2). An included angle between two mounting slots (2) forming a V-shaped structure in the mounting slots (2) is Δ. A numerical value of a thickness of the permanent magnets (3) is L4 when a unit thereof is mm. A numerical value of a width of the permanent magnets (3) is L5 when a unit thereof is mm. $110° \leq \Delta \leq 140°$. A numerical value of $\Delta = (18 \text{ to } 20)*L4$, $L5 \geq 2*L4$.

11 Claims, 4 Drawing Sheets

(58) Field of Classification Search
USPC .................... 310/156.01, 156.31, 156.83
See application file for complete search history.

(56) References Cited

FOREIGN PATENT DOCUMENTS

| CN | 203674829 | U | | 6/2014 | | |
|----|-----------|---|---|--------|---|---|
| CN | 203805986 | U | | 9/2014 | | |
| CN | 204349610 | U | | 5/2015 | | |
| CN | 106451852 | A | | 2/2017 | | |
| CN | 205986561 | U | | 2/2017 | | |
| CN | 106972667 | A | * | 7/2017 | ............. | H02K 1/165 |
| CN | 108768023 | A | | 11/2018 | | |
| CN | 109412297 | A | | 3/2019 | | |
| CN | 110752685 | A | | 2/2020 | | |
| CN | 110832755 | A | | 2/2020 | | |
| CN | 111082561 | A | | 4/2020 | | |
| CN | 210431052 | U | | 4/2020 | | |
| CN | 210577990 | U | | 5/2020 | | |
| CN | 211127449 | U | * | 7/2020 | | |
| CN | 211579724 | U | | 9/2020 | | |
| CN | 112467909 | A | | 3/2021 | | |
| CN | 214255912 | U | | 9/2021 | | |
| EP | 3107192 | A1 | * | 12/2016 | ............. | F04D 19/04 |
| JP | 2004229433 | A | | 8/2004 | | |
| JP | 2010178471 | A | | 8/2010 | | |
| WO | 2019/233733 | A1 | | 12/2019 | | |

OTHER PUBLICATIONS

Extended European Search Report mailed Apr. 22, 2024, issued in corresponding European Application No. EP21896372, filed Jul. 30, 2021, 7 pages.

International Search Report and Written Opinion mailed Oct. 27, 2021, issued in corresponding International Application No. PCT/CN2021/109494, filed Jul. 30, 2021, 12 pages.

* cited by examiner

| Order of harmonics | Amplitude/V | Harmonic content per order/% |
|---|---|---|
| 1 | 931.2627101 | / |
| 3 | 0.43242275 | 0.05 |
| 5 | 10.77340644 | 1.16 |
| 7 | 8.89699512 | 0.96 |
| 9 | 10.10667616 | 1.09 |
| 11 | 7.785013177 | 0.84 |
| 13 | 6.244835212 | 0.67 |
| Total harmonic content | | 2.14 |

FIG. 3

MOTOR ROTOR, PERMANENT MAGNET MOTOR, AND ELECTRIC VEHICLE

CROSS-REFERENCE TO RELATED APPLICATIONS

This application is a National Stage of International Application No. PCT/CN2021/109494, filed Jul. 30, 2021, which is based on and claims priority to Chinese patent application No. 202011381538.3, filed on Nov. 30, 2020, the content of which are hereby incorporated by reference in its entirety.

TECHNICAL FIELD

The present disclosure relates to the technical field of motors, and in particular to a motor rotor, a permanent magnet motor, and an electric vehicle.

BACKGROUND

The electric vehicle is a main type of new energy vehicle at present. Compared with a traditional internal combustion engine vehicle, the electric vehicle has great changes in power source and structure of its power transmission system, resulting in new characteristics of torsional vibration of a powertrain. Research on how to reduce the torsional vibration of the electric vehicle power transmission system is of great significance to improve the safety and comfort of the whole vehicle. The drive motor is the main excitation source of the steady-state torsional vibration of the powertrain, and its torque fluctuation and frequency characteristics directly affect the steady-state torsional vibration response of the powertrain.

As the core power system of the electric vehicle, the drive motor plays a decisive role in the power performance and cruising range of the electric vehicle. At present, permanent magnet synchronous motors, especially built-in permanent magnet synchronous motors, are widely used in electric vehicle drive systems because of their advantages such as wide speed range, high efficiency, high power density, compact structure and fast response. For example, the driving motors of electric vehicles such as Toyota Prius, BMW I3, and Honda Civic are all built-in permanent magnet synchronous motors. In addition, the corresponding control technology has gradually developed and matured. Therefore, the built-in permanent magnet synchronous motors have more development space in the field of electric vehicle drive motors. Because the rotor structure has not only a great influence on the performance of the motor but also great design flexibility, studying the influence of the topological structure of the rotor on the performance of the motor is of great significance to promote the development and application of the built-in permanent magnet synchronous motor.

The topological structure of the rotor of the permanent magnet synchronous motor has a great influence on the performance of the motor. Compared with the surface-mounted permanent magnet rotor structure, the built-in permanent magnet rotor structure has a higher permanent magnet utilization rate and a wider constant-power speed range due to the asymmetry of the rotor magnetic circuit. Meanwhile, the built-in permanent magnet synchronous motor also has the characteristics of great flexibility in rotor design. Therefore, the overload capacity, efficiency, and power density, as well as speed regulation ability of the motor can be improved by changing the topological structure of the rotor. The rotor structures of the built-in permanent magnet synchronous motors are relatively flexible with a variety of designs, and different rotor topological structures can make a great difference to the performance of the built-in permanent magnet synchronous motors.

There are two main reasons for the torque fluctuation of the permanent magnet synchronous motor: the magnetic field harmonics and inductance harmonics caused by a non-ideal structure of the motor body, and the voltage harmonics and current harmonics caused by the nonlinear characteristic of the inverter. The magnetic field harmonics and inductance harmonics will also lead to voltage and current harmonics in the motor control system, and harmonic currents will eventually lead to torque fluctuations of the motor.

The body structure of the permanent magnet synchronous motor mainly includes a stator core and permanent magnets. The permanent magnets will generate magnetic flux, including radial magnetic flux and tangential magnetic flux. The flow of magnetic flux enters the stator core through the air gap of the motor with less traveling tangentially. The air-gap magnetic field formed by the main flux will act on the rotor, causing deformation of the stator core and the rotor of the motor, resulting in cyclic vibration. The radial electromagnetic force is the interaction force between the stator core and the rotor, and thus is the main source of the electromagnetic vibration noise of the permanent magnet synchronous motor, while the radial electromagnetic force wave of the motor is closely related to the harmonic components of the air gap magnetic field of the motor.

The running harmonics of a permanent magnet motor are mainly divided into time harmonics and space harmonics. The time harmonics are mainly due to the fact that harmonic voltage and harmonic current are generated inside the motor in the case of non-sinusoidal power supply of the power source connected to the motor. The nonlinearity of power supply is mainly due to the nonlinearity of power electronic devices in an actual inverting process, mainly including the dead time and conduction voltage drop of the power electronic devices. The space harmonics are mainly caused by the motor body. In design of the motor body, due to the limited number of pole pairs and the limited number of teeth and slots of the motor, the rotating magnetic field generated by the stator winding during the operation of the motor is not a standard rotating magnetic field. The main factors affecting the space harmonics of the motor are the cogging effect, winding distribution form, magnetic saturation degree of the magnetic circuit, topological structure of the rotor, etc. In addition, the manufacturing process of the motor, which cannot be in an ideal state, will inevitably cause errors such as winding errors, permanent magnet rotor coaxiality errors, etc. These factors will cause the motor to generate high-order harmonics, which will endanger the operation of the motor. There are two main reasons for the running harmonics of the permanent magnet synchronous motor: (1) The harmonics caused by the distortion of the air-gap magnetic field inside the motor; (2) The harmonics generated in the inverting process with conduction voltage drop as the power electronic device is not an ideal device.

During the operation of the motor, the harmonic electromotive force is harmful: (1) The harmonic electromotive force will deteriorate the electromotive force waveforms of the permanent magnet motor, resulting in a decrease in smoothness of the output torque of the motor and an increase in torque ripple, thus producing great noise. (2) The harmonics will also increase the temperature of the motor, aging the insulting layers of the motor components, increasing the loss of the motor body, and reducing the working efficiency of the motor. (3) The high-order harmonics in the operation of the motor will generate a harmonic magnetic field in the vehicle, which will cause electromagnetic interference to other communications around and affect operation safety of the vehicle.

Therefore, at present, how to effectively control the counter-electromotive force harmonics, increase the output torque of the motor, and improve the working performance of the motor are issues that need to be considered in the motor design.

SUMMARY

The present disclosure provides a motor rotor, a permanent magnet motor, and an electric vehicle.

According to an aspect of the present disclosure, a motor rotor is provided, including a rotor core and permanent magnets. The rotor core includes mounting slots. The permanent magnets are arranged in the mounting slots. An included angle between two mounting slots forming a V-shaped structure in the mounting slots is $\Delta$. A numerical value of a thickness of the permanent magnets is L4 when a unit thereof is mm. A numerical value of a width of the permanent magnets is L5 when a unit thereof is mm. $110°\leq\Delta\leq140°$. A numerical value of $\Delta=(18$ to $20)*L4$, $L5\geq2*L4$.

In some embodiments, flux barriers are formed between the mounting slots and a peripheral wall of the rotor core, and a numerical value of a circumferential length of the flux barrier is L3 when a unit thereof is mm, where $L3\geq L4$.

In some embodiments, at least one side wall of the mounting slots coupled with the permanent magnets is provided with a relief groove. The relief groove corresponds to a corner position of the permanent magnets. The relief groove is an arc-shaped groove. A radius R1 of the relief groove satisfies $0.2$ mm$\leq R1\leq0.5$ mm.

In some embodiments, in a cross-section perpendicular to a central axis of the rotor core, the mounting slot includes a first edge and a second edge adjacent to the first edge, the first edge is an outer edge of the V-shaped structure, the second edge is located at a side of the mounting slot adjacent to a peripheral wall of the rotor core, the first edge and the second edge are connected through a first circular arc and a second circular arc as transitions, a circle center of the first circular arc and a circle center of the second circular arc are separated from each other.

In some embodiments, a distance between the circle center of the first circular arc and the circle center of the second circular arc is L2, where $0.2$ mm$\leq L2\leq0.4$ mm.

In some embodiments, in a cross-section perpendicular to a central axis of the rotor core (1), the mounting slot includes a second edge and a third edge adjacent to the second edge, the second edge is located at a side of the mounting slot adjacent to a peripheral wall of the rotor core, the third edge is an inner edge of the V-shaped structure. The second edge and the third edge are connected through a third circular arc as a transition. A numerical value of a radius of the third circular arc is R4 when a unit thereof is mm, where $R4=(0.5$ to $0.6)*L4$.

In some embodiments, in a cross-section perpendicular to a central axis of the rotor core, the rotor core includes a plurality of weight reducing slots arranged along a circumferential direction, and the plurality of weight reducing slots are located at a side of the mounting slots adjacent to the central axis of the rotor core along a radial direction of the rotor core.

In some embodiments, along the radial direction of the rotor core, a numerical value of a minimum distance between the mounting slots and the central axis of the rotor core is R5 when a unit thereof is mm. A numerical value of a maximum distance between an outer edge of the weight reducing slots and the central axis of the rotor core is R6 when a unit thereof is mm. A numerical value of a minimum distance between an inner edge of the weight reducing slots and the central axis of the rotor core is R7 when a unit thereof is mm. A numerical value of a distance between two adjacent weight reducing slots is L6 when a unit thereof is mm. A numerical value of a radius of a central shaft hole of the rotor core is R8 when a unit thereof is mm. A numerical value of a maximum speed of the rotor core is $\omega$ when a unit thereof is 10,000 revolutions per minute. A numerical value of a radius of the rotor core is R9 when a unit thereof is mm. Wherein $$R6=R5-(0.6 \text{ to } 0.7)*\omega^2*R9;$$

$$R7=R8+(0.07 \text{ to } 0.1)*\omega^2*R9;$$

$$L6=(0.8 \text{ to } 0.11)*\omega^2*R9.$$

According to another aspect of the present disclosure, a permanent magnet motor is provided, including a motor rotor, and the motor rotor is the above-described motor rotor.

According to another aspect of the present disclosure, an electric vehicle is provided, including a permanent magnet motor, and the permanent magnet motor is the above-described permanent magnet motor.

BRIEF DESCRIPTION OF THE DRAWINGS

FIG. 3 shows a harmonic content table of a permanent magnet motor according to an embodiment of the present disclosure.

The reference signs are indicated as:

1, rotor core; 2, mounting slot; 3, permanent magnet; 4, flux barrier; 5, relief groove; 6, first edge; 7, second edge; 8, third edge; 9, first circular arc; 10, second circular arc; 11, third circular arc; 12, weight reducing slot.

DETAILED DESCRIPTION

Figure 1:
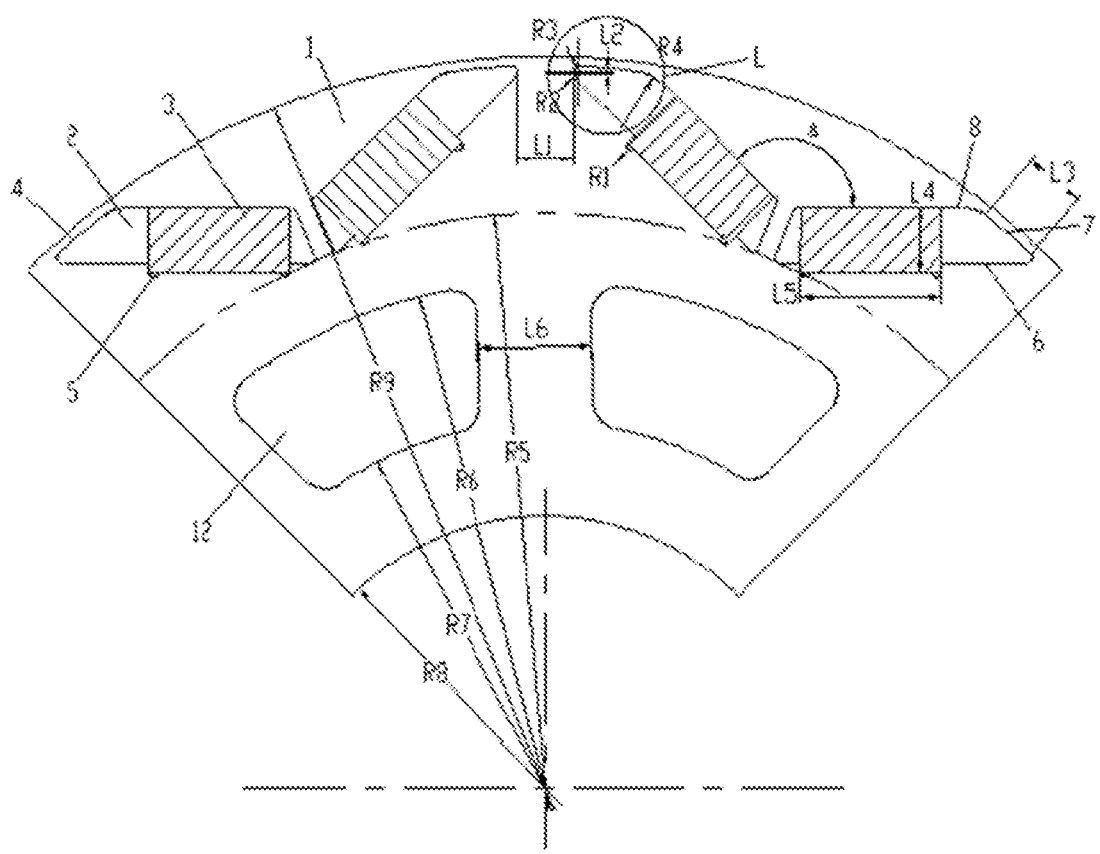
FIG. 1 is a schematic partial view of a motor rotor according to an embodiment of the present disclosure.
Figure 2:
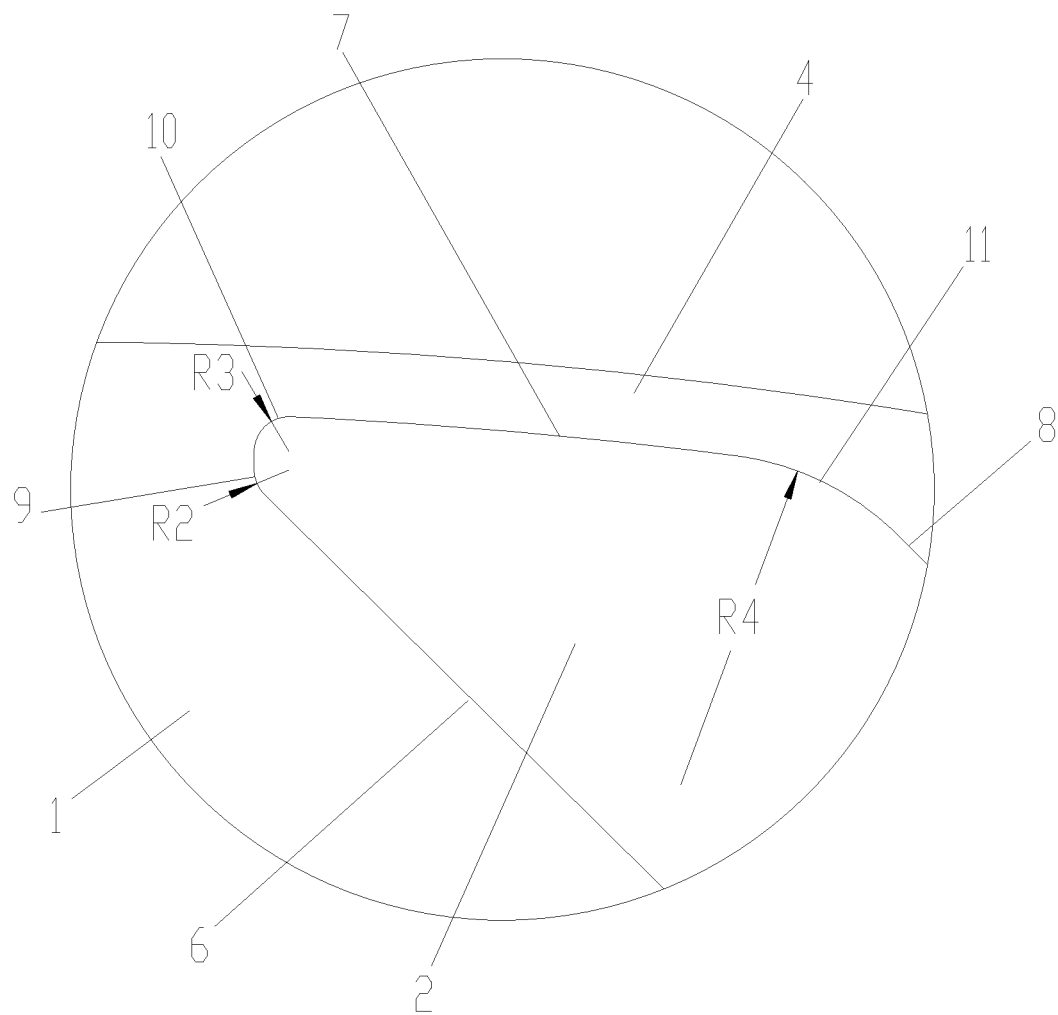
FIG. 2 is a schematic enlarged view of portion L in FIG. 1.

Referring to FIG. 1 to FIG. 2, according to an embodiment of the present disclosure, a motor rotor includes a rotor core 1 and permanent magnets 3. The rotor core 1 includes mounting slots 2. An angle between two mounting slots 2 forming a V-shaped structure in the mounting slots 2 is $\Delta$. The permanent magnets 3 are arranged in the mounting slots 2. The numerical value of the thickness of the permanent magnet 3 is L4 when the unit thereof is millimeters (mm), and the numerical value of the width of the permanent magnet 3 is L5 when the unit thereof is mm. $110°\leq\Delta\leq140°$. The numerical value of $\Delta=(18$ to $20)*L4$. $L5\geq2*L4$.

The motor rotor provided by the present disclosure includes the rotor core 1 and the permanent magnets 3. The rotor core 1 includes the mounting slots 2. The angle between the two mounting slots 2 forming a V-shaped structure in the mounting slots 2 is $\Delta$. The permanent magnets 3 are arranged in the mounting slots 2. The numerical value of the thickness of the permanent magnet 3 is L4 when the unit thereof is mm, and the numerical value of the width of the permanent magnet 3 is L5 when the unit thereof is mm. $110° \le \Delta \le 140°$. The numerical value of $\Delta = (18$ to $20)*L4$. $L5 \ge 2*L4$. By adopting the above-described motor rotor of the present disclosure, constraints can be given to the key dimensions of the topological structure of the rotor, which can greatly reduce the no-load counter-electromotive force harmonics and torque ripple of the motor (each≤3%), increase the output torque and power density of the motor, improve the smoothness of the output torque of the motor, reduce the vibration and noise of the motor, and improve the comfort of the vehicle. The reduction of harmonics can reduce rotor loss, increase motor efficiency, and avoid high-order harmonics from interfering with other components.

The motor rotor adopts the existing V-shaped topological structure without adding redundant hollow structures. By enlarging the pole arc of the rotor, the torque output capability of the motor can be improved, thereby improving the overload capacity, efficiency, and power density of the motor, and improving the speed regulation capability as well. By using the rotor with the topologic structure that is easy to weaken the magnetic flux, the flux-weakening angle is small under a high-speed condition, the motor current is reduced, the motor loss can be significantly reduced, the efficiency of the motor at the high speed is improved, the overall efficiency of the motor is improved, and the proportion of the high-efficiency area of the motor is increased.

The length direction of the permanent magnets 3 is in the axial direction of the rotor core 1. The width directions of the permanent magnets 3 are in the cross-section perpendicular to the central axis of the rotor core 1, extending along the arms of the V-shaped structure. The thickness directions of the permanent magnet 3 are the directions perpendicular to the arms of the V-shaped structure.

In some embodiments, flux barriers 4 are formed between the mounting slots 2 and the peripheral wall of the rotor core 1, and the numerical value of the circumferential length of the flux barrier 4 is L3 when the unit thereof is mm, where $L3 \ge L4$.

It is found through research that the circumferential length L3 of the flux barrier 4 is a factor affecting harmonic content and torque ripple. If space permits, $L3 \ge L4$ can render better harmonic content and torque ripple. The lengthening of the flux barrier 4 can also reduce the magnetic flux leakage of the rotor, improve the output capacity of the motor, improve the structural strength of the rotor, and ensure that the motor can output a higher speed without damage. In some embodiments, $1.2 \le L3/L4 \le 1.4$.

In some embodiments, at least one side wall of the mounting slot 2 coupled with the permanent magnet 3 is provided with a relief groove 5. The relief groove 5 corresponds to a corner position of the permanent magnet 3. The relief groove 5 is an arc-shaped groove. The radius R1 of the relief groove 5 satisfies $0.2 \text{ mm} \le R1 \le 0.5 \text{ mm}$. The arc-shaped groove with the radius of R1 is configured for convenient arrangement of the permanent magnet. The relief groove 5 can improve the demagnetization resistance of the permanent magnet and avoid irreversible demagnetization of the motor under high current or high temperature condition. In addition, the relief groove 5 can reduce the chamfering of the permanent magnet, so that the permanent magnet 3 can be inserted into the mounting slot 2 smoothly even if it has no chamfer. In the present embodiment, the thickness of the position of the mounting slot 2 where the permanent magnet 3 is installed is greater than the thickness of the other positions of the mounting slot 2, and a step is formed between the wider structure at this position and the structures at the other positions, limiting the installation position of the permanent magnet 3 in the mounting slot 2 to prevent displacement during the working process of the motor rotor.

In the cross-section perpendicular to the central axis of the rotor core 1, the mounting slot 2 includes a first edge 6 and a second edge 7 adjacent to the first edge 6. The first edge 6 is an outer edge of the V-shaped structure. The second edge 7 is located at the side of the mounting slot 2 adjacent to the peripheral wall of the rotor core 1. The first edge 6 and the second edge 7 are connected through a first circular arc 9 and a second circular arc 10 as transitions. The circle center of the first circular arc 9 and the circle center of the second circular arc 10 are separated from each other.

In some embodiments, a distance between the circle center of the first circular arc 9 and the circle center of the second circular arc 10 is L2, where $0.2 \text{ mm} \le L2 \le 0.4 \text{ mm}$.

If the circle centers of the first circular arc 9 and the second circular arc 10 coincide with each other, the flux barrier here will be too short to effectively prevent the magnetic flux. By appropriately setting the distance between the circle center of the first circular arc 9 and the circle center of the second circular arc 10, the performance requirements of the motor can be met and lower harmonics can be achieved as well.

In the cross-section perpendicular to the central axis of the rotor core 1, the mounting slot 2 includes a second edge 7 and a third edge 8 adjacent to the second edge 7. The second edge 7 is located at the side of the mounting slot 2 adjacent to the peripheral wall of the rotor core 1. The third edge 8 is an inner edge of the V-shaped structure. The second edge 7 and the third edge 8 are connected through a third circular arc 11 as a transition. The numerical value of the radius of the third circular arc 11 is R4 when the unit thereof is mm, where $R4 = (0.5 \text{ to } 0.6)*L4$.

Since the thickness of the permanent magnet 3 represented by L4 is closely related to the circumferential length of the flux barrier 4 represented by L3, and the radius of the third circular arc 11 will affect the circumferential length of the flux barrier 4. Thus, the radius of the third circular arc 11 is associated with the thickness of the permanent magnet 3, so that the radius of the third circular arc 11 has an appropriate value, and the relationship between the circumferential length of the flux barrier 4 and the thickness of the permanent magnet 3 will be in an optimum range.

In the cross-section perpendicular to the central axis of the rotor core 1, the rotor core 1 includes a plurality of weight reducing slots 12 arranged along the circumferential direction. The plurality of weight reducing slots 12 are located at a side of the mounting slots 2 adjacent to the central axis of the rotor core 1 along the radial direction of the rotor core 1, that is, at an inner side of the mounting slots 2.

Along the radial direction of the rotor core 1, the numerical value of the minimum distance between the mounting slot 2 and the central axis of the rotor core 1 is R5 when the unit thereof is mm, the numerical value of the maximum distance between the outer edge of the weight reducing slot 12 and the central axis of the rotor core 1 is R6 when the unit thereof is mm, the numerical value of the minimum distance between the inner edge of the weight reducing slot 12 and the central axis of the rotor core 1 is R7 when the unit thereof is mm. The numerical value of the distance between two adjacent weight reducing slots 12 is L6 when the unit thereof is mm. The numerical value of the radius of the central shaft hole of the rotor core 1 is R8 when the unit thereof is mm.

The numerical value of the maximum speed of the rotor core 1 is ω when the unit thereof is 10,000 revolutions per minute (rpm). The numerical value of the radius of the rotor core 1 is R9 when the unit thereof is mm. Wherein, $$R6=R5-(0.6\ to\ 0.7)*\omega^2*R9;$$

$$R7=R8+(0.07\ to\ 0.1)*\omega^2*R9;$$

$$L6=(0.8\ to\ 0.11)*\omega^2*R9.$$

As limited by the above relationships, the magnetic circuit of the rotor and the strength of the rotor can be ensured, and an optimal weight reduction effect can be achieved as well.

According to an embodiment of the present disclosure, the permanent magnet motor includes a motor rotor, and the motor rotor is the above-described motor rotor.

Figure 4:
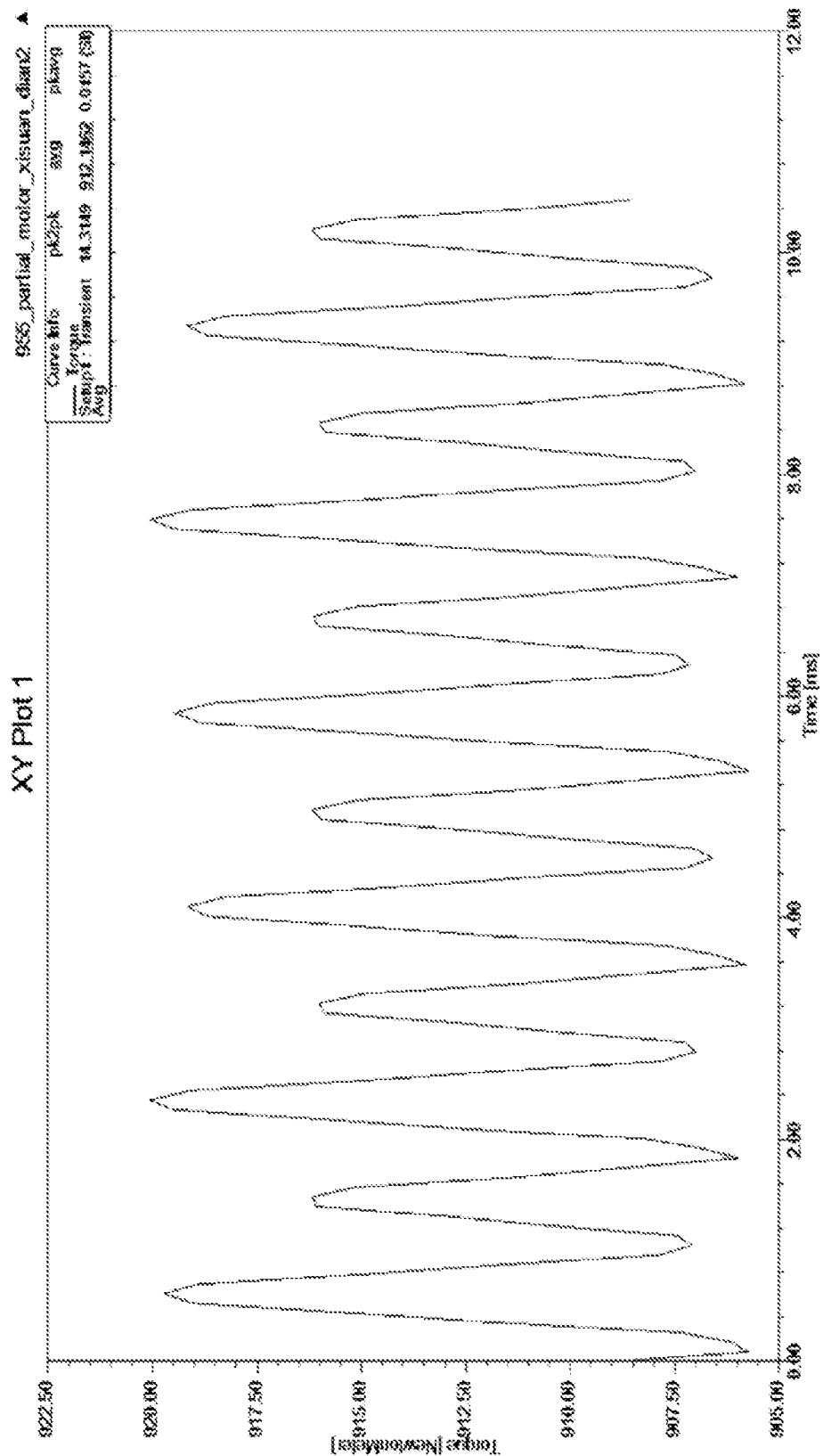
FIG. 4 shows a torque ripple diagram of the permanent magnet motor according to an embodiment of the present disclosure.

As shown in FIG. 3 and FIG. 4, by using the permanent magnet motor of the embodiments of the present disclosure, the maximum harmonic content is 2.14%, and the torque ripple is 1.57%, so the harmonic content and the torque ripple are both below 3%, which can effectively reduce the vibration force of the motor, significantly reduce the steady-state torsional vibration response of the motor excitation transmission system. Thus, the torsional vibration of the electric vehicle power transmission system can be reduced, the overall noise and vibration can be reduced, and the safety and comfort of the vehicle can be improved.

By adopting the embodiments of the present disclosure, the no-load counter-electromotive force harmonics of the permanent magnet motor can be reduced to less than 3%, so that decrease in smoothness of the output torque, increase in torque ripple, and generation of large noise of the motor caused by the large on-load harmonics can be avoided. The reduction of harmonics can also reduce the temperature of the motor in operation, avoid the aging of the insulating layers of the motor components, and reduce the loss of the motor body and improve the efficiency of the motor. The high-order harmonics generated in operation of the motor can be reduced, and thus the electromagnetic interference to other communications around caused by the harmonic magnetic field generated in the vehicle can be avoided and the safety of the vehicle can be improved.

The reduction of harmonics can reduce the loss on the rotor surface due to the air-gap harmonic magnetic field, avoid the large temperature rise of the rotor, reduce the temperature of the permanent magnets in operation, so as to improve the magnetic performance of the permanent magnets and the output performance and efficiency of the motor.

According to an embodiment of the present disclosure, the electric vehicle includes a permanent magnet motor, and the permanent magnet motor is the above-described permanent magnet motor.

Those skilled in the art can easily understand that the above-described means can be freely combined and superimposed as long as there is no contradiction.

The above are only embodiments of the present disclosure, and are not intended to limit the present disclosure. Any modifications, equivalent replacements and improvements made within the spirit and principles of the present disclosure shall be included in the protection scope of the present disclosure. The above are only preferred implementations of the present disclosure. It should be pointed out that for those of ordinary skill in the art, some improvements and modifications can be made without departing from the technical principles of the present disclosure. These improvements and modifications should also be regarded as within the protection scope of the present disclosure.

What is claimed is:

1. A motor rotor, comprising:
a rotor core, the rotor core comprising mounting slots;
permanent magnets, arranged in the mounting slots;
wherein an included angle between two mounting slots forming a V-shaped structure in the mounting slots is Δ, a numerical value of a thickness of the permanent magnets is L4 when a unit thereof is mm, and a numerical value of a width of the permanent magnets is L5 when a unit thereof is mm, where 110°≤Δ≤140°, a numerical value of Δ=(18 to 20)*L4, L5≥2*L4.

2. The motor rotor according to claim 1, wherein flux barriers are formed between the mounting slots and a peripheral wall of the rotor core, and a numerical value of a circumferential length of each of the flux barriers is L3 when a unit thereof is mm, where L3≥L4.

3. The motor rotor according to claim 2, wherein 1.2≤L3/L4≤1.4.

4. The motor rotor according to claim 1, wherein at least one side wall of the mounting slots coupled with the permanent magnets is provided with a relief groove, the relief groove corresponds to a corner position of the permanent magnets, the relief groove is an arc-shaped groove, a radius R1 of the relief groove satisfies 0.2 mm≤R1≤0.5 mm.

5. The motor rotor according to claim 1, wherein in a cross-section perpendicular to a central axis of the rotor core, each of the mounting slots comprises a first edge and a second edge adjacent to the first edge, the first edge is an outer edge of the V-shaped structure, the second edge is located at a side of the each of the mounting slots adjacent to a peripheral wall of the rotor core, the first edge and the second edge are connected through a first circular arc and a second circular arc as transitions, a circle center of the first circular arc and a circle center of the second circular arc are separated from each other.

6. The motor rotor according to claim 5, wherein a distance between the circle center of the first circular arc and the circle center of the second circular arc is L2, where 0.2 mm≤L2≤0.4 mm.

7. The motor rotor according to claim 1, wherein in a cross-section perpendicular to a central axis of the rotor core, each of the mounting slots comprises a second edge and a third edge adjacent to the second edge, the second edge is located at a side of the each of the mounting slots adjacent to a peripheral wall of the rotor core, the third edge is an inner edge of the V-shaped structure, the second edge and the third edge are connected through a third circular arc as a transition, a numerical value of a radius of the third circular arc is R4 when a unit thereof is mm, where R4=(0.5 to 0.6)*L4.

8. The motor rotor according to claim 1, wherein in a cross-section perpendicular to a central axis of the rotor core, the rotor core comprises a plurality of weight reducing slots arranged along a circumferential direction of the rotor core, the plurality of weight reducing slots are located at a side of the mounting slots adjacent to the central axis of the rotor core along a radial direction of the rotor core.

9. The motor rotor according to claim 8, wherein along the radial direction of the rotor core, a numerical value of a minimum distance between the mounting slots and the central axis of the rotor core is R5 when a unit thereof is mm, a numerical value of a maximum distance between an outer edge of the weight reducing slots and the central axis of the rotor core is R6 when a unit thereof is mm, a numerical value of a minimum distance between an inner edge of the weight reducing slots and the central axis of the rotor core is R7 when a unit thereof is mm, a numerical value of a distance between two adjacent weight reducing slots is L6 when a unit thereof is mm, a numerical value of a radius of a central shaft hole of the rotor core is R8 when a unit thereof is mm, a numerical value of a maximum speed of the rotor core is ω when a unit thereof is 10,000 revolutions per minute, a numerical value of a radius of the rotor core is R9 when a unit thereof is mm, where $R6=R5-(0.6 \text{ to } 0.7)*\omega^2*R9$;

$R7=R8+(0.07 \text{ to } 0.1)*\omega^2*R9$;

$L6=(0.8 \text{ to } 0.11)*\omega^2*R9$.

10. A permanent magnet motor comprising a motor rotor, wherein the motor rotor is the motor rotor according to claim 1.

11. An electric vehicle comprising a permanent magnet motor, wherein the permanent magnet motor is the permanent magnet motor according to claim 10.

* * * * *